(12) United States Patent
Imanishi (10) Patent No.: US 12,429,854 B2
(45) Date of Patent: Sep. 30, 2025

(54) NUMERICAL CONTROL SYSTEM, AND METHOD FOR CONTROLLING INDUSTRIAL MACHINE

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 233 days.

(21) Appl. No.: 18/251,774

(22) PCT Filed: Nov. 5, 2021

(86) PCT No.: PCT/JP2021/040773
§ 371 (c)(1),
(2) Date: May 4, 2023

(87) PCT Pub. No.: WO2022/097719
PCT Pub. Date: May 12, 2022

(65) Prior Publication Data
US 2024/0004371 A1 Jan. 4, 2024

(30) Foreign Application Priority Data
Nov. 9, 2020 (JP) .................... 2020-186407

(51) Int. Cl.
*G05B 19/418* (2006.01)
(52) U.S. Cl.
CPC .............. *G05B 19/41825* (2013.01); *G05B 2219/39001* (2013.01)
(58) Field of Classification Search
CPC ............. B25J 9/161; B25J 9/1658; G05B 2219/36242; G05B 19/41825; G05B 19/18
(Continued)

(56) References Cited

U.S. PATENT DOCUMENTS 4,543,639 A * 9/1985 Inaba ............... G05B 19/41825
700/249
2019/0049925 A1* 2/2019 Shimamura ........ G05B 19/4145
(Continued)

FOREIGN PATENT DOCUMENTS

JP       S58-022412 A      2/1983
JP       2014-241018 A    12/2014
(Continued)

OTHER PUBLICATIONS

International Search Report issued in PCT/JP2021/040773; mailed Jan. 25, 2022.

*Primary Examiner* — B M M Hannan
(74) *Attorney, Agent, or Firm* — Studebaker Brackett PLLC (57) ABSTRACT

A numerical control system 1 is provided with: a numerical control device 5 including a machine tool control module 50; a robot controller 6 including a robot control module 60 for controlling the movement of a robot 3; and a variable storage unit 58 for storing the values of a plurality of variables that can be read and written by both modules 50, 60. The machine tool control module 50 reads the value of a second variable stored in a second storage area 582 of the variable storage unit 58, controls the movement of a machine tool 2 on the basis of the value that has been read, and rewrites the value of a first variable stored in a first storage area 581, and the robot control module 60 reads the value of the first variable, controls the movement of the robot 3 on the basis of the value of the first variable that has been read, and rewrites the value of the second variable.

6 Claims, 5 Drawing Sheets

(58) Field of Classification Search
USPC .......................................................... 700/245
See application file for complete search history.

(56) References Cited

U.S. PATENT DOCUMENTS

| | | | |
|---|---|---|---|
| 2019/0095246 A1* | 3/2019 | Nakano | G05B 19/052 |
| 2019/0095247 A1* | 3/2019 | Shimamura | G05B 19/408 |
| 2019/0101904 A1* | 4/2019 | Shimamura | G05B 19/41825 |
| 2021/0181717 A1* | 6/2021 | Mizuno | G05B 19/4155 |
| 2021/0181723 A1* | 6/2021 | Mizuno | G05B 19/4155 |
| 2021/0182101 A1* | 6/2021 | Mizuno | G06F 9/3856 |

FOREIGN PATENT DOCUMENTS

| | | |
|---|---|---|
| JP | 2018-195055 A | 12/2018 |
| WO | 2020/144772 A1 | 7/2020 |

\* cited by examiner

FIG. 3

```
N10   O0100
N11   G00 X50.0 C0.0
N12   M03 S2000
N13   G83 Z-40.0 R-5.0 P500 F5.0
N14   C90.0
N15   G80
N16   /*COMPLETE MACHINING*/

N20   S0 /*STOP SPINDLE*/
N21   #500 = 1

N30   G00 X-50.0 Y-50.0 Z-50.0 /*MOVE OUT OF INTERFERENCE AREA*/
N31   #501 = 1
N32   M88 (OPEN DOOR)
N33   #502 = 1
N34   #503=1 (REQUEST WORKPIECE REPLACEMENT)
M35   /*WAIT FOR COMPLETION OF OPERATION OF ROBOT*/
N36   WHILE[#150 EQ 0] DO1;
N37   END 1
N38   #503 = 0;/*NOT REQUESTING WORKPIECE REPLACEMENT*/
N39   M89 (CLOSE DOOR)
N40   #502 = 0
N41   /*NEXT CYCLE*/
N42   M03 S2000
N43   G00 X40.0
```

FIG. 4

```
N50     (MONITOR REQUEST FROM ROBOT)

N60     IF[#101 EQ 1] THEN;
N61     M98 P0001; (OPEN DOOR)
N62     ENDIF;

N70     IF[#102 EQ 1] THEN;
N71     M98 P0002; (CLOSE DOOR)
N72     ENDIF;

N80     IF[#103 EQ 1] THEN;
N81     M98 P0003; (OPEN CHUCK)
N82     ENDIF;
...
N90     IF[#105 EQ 1] THEN;
N91     M98 P0005; (START FIRST MACHINING)
N92     ENDIF;

N100    (RETURN TO TOP DURING BEING NOT REQUESTING WORKPIECE REPLACEMENT)
N101    IF[#100 EQ 0] GOTO 50;

```
O0001
M88; (OPEN DOOR)
#101 = 0; (NOTIFY COMPLETION OF OPENING DOOR)
M99;
```

നുമേരിക്കൽ കൺട്രോൾ സിസ്റ്റം# NUMERICAL CONTROL SYSTEM, AND METHOD FOR CONTROLLING INDUSTRIAL MACHINE

TECHNICAL FIELD

The present disclosure relates to a numerical control system and an industrial machine control method.

BACKGROUND ART

In recent years, in order to promote automation of a processing site, a numerical control system for controlling in interlock the operation of a machine tool for machining a workpiece and the operation of a robot for attaching and detaching the workpiece to and from the machine tool has been desired (for example, see Patent Document 1). Generally, the operation of the machine tool is controlled by a numerical control device and the operation of the robot is controlled by a robot controller. Therefore, in order to control the operation of the machine tool and the operation of the robot in conjunction with each other, it is necessary to operate both the numerical control device and the robot controller. On the other hand, in the numerical control system shown in Patent Document 1, selection of an operation program of the robot and setting of the operation program are made possible in accordance with a command from the user from the numerical control device, thereby facilitating setting by the user.

Patent Document 1: Japanese Unexamined Patent Application, Publication No. 2018-195055

DISCLOSURE OF THE INVENTION

Problems to be Solved by the Invention

When the existing machine tool and the robot installed later are controlled in conjunction with each other, it is necessary to connect a numerical control device for controlling the operation of the machine tool and a robot controller for controlling the operation of the robot. At this time, it is also necessary to newly add commands such as I/O signals and M codes to the numerical control device and the robot controller, and to newly install an external device such as a PLC (programmable logic controller). At this time, since the I/O signal also needs to be transmitted to the robot controller via the ladder circuit of the numerical control device, it is necessary to edit the existing ladder circuit. For this reason, there are cases where flexible handling cannot be achieved at an actual machining site.

The present disclosure has been made in view of the above problems, and it is an object of the present disclosure to provide a numerical control system and an industrial machine control method capable of easily interlocking a machine tool and a robot.

Means for Solving the Problems

An aspect of the present disclosure is directed to a numerical control system that controls operations of a machine tool and a robot in conjunction with each other, the system including: a numerical control device including a first controller that controls the operation of the machine tool based on a numerical control program; a robot control device including a second controller that controls the operation of the robot based on a robot control program; and a storage device that stores a variable value which is readable and writable by the first controller and the second controller, in which the first controller reads the variable value stored in the storage device to control the operation of the machine tool based on the read variable value, and the second controller reads the variable value stored in the storage device to control the operation of the robot based on the read variable value.

Another aspect of the present disclosure is directed to an industrial machine control method that controls operations of a machine tool and a robot in conjunction with each other by using a numerical control system including a first controller that controls the operation of the machine tool based on a numerical control program, a second controller that controls the operation of the robot based on a robot control program, and a storage device that stores a variable value which is readable and writable by the first controller and the second controller, the method including: the first controller reading the variable value stored in the storage device to control the operation of the machine tool based on the read variable value, and the second controller reading the variable value stored in the storage device to control the operation of the robot based on the read variable value.

Effects of the Invention

According to an aspect of the present disclosure, the numerical control system includes the first controller that controls the operation of the machine tool based on the numerical control program; the second controller that controls the operation of the robot based on the robot control program; and the storage device that stores the variable values that can be read and written from both the first controller and the second controller. The first controller reads the rewritable variable value from the second controller, controls the operation of the machine tool based on the read variable value, and the second controller reads the rewritable variable value from the first controller, and controls the operation of the robot based on the read variable value. According to one aspect of the present disclosure, since the notification and request from the first controller to the second controller, the notification and request from the second controller to the first controller, and the like can be performed via variables which can be read and written from both of them, it is possible to make the machine tool and the robot interlock with each other without adding an I/O signal or an external device or editing an existing ladder circuit. Furthermore, according to one aspect of the present disclosure, it is possible to handle various automated forms simply by storing various variable values in the storage device.

PREFERRED MODE FOR CARRYING OUT THE INVENTION

Hereinafter, a numerical control system 1 according to an embodiment of the present disclosure will be described with reference to the drawings.

Figure 1:
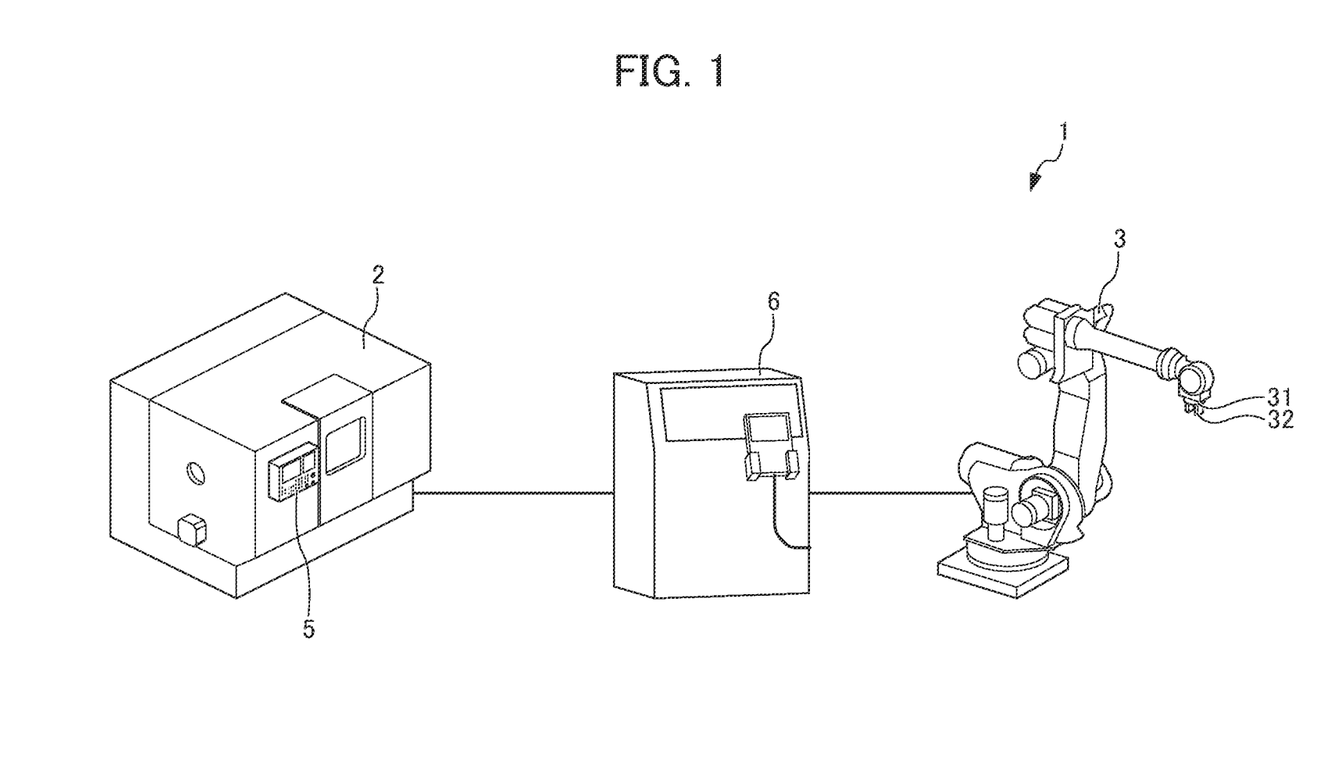
FIG. 1 is a schematic diagram of a numerical control system according to an embodiment of the present disclosure.

FIG. 1 is a schematic diagram of a numerical control system 1 according to the present embodiment.

The numerical control system 1 includes a machine tool 2 for machining a workpiece (not shown), a numerical control device (CNC) 5 for controlling the operation of the machine tool 2, a robot 3 provided in the vicinity of the machine tool 2, and a robot controller 6 for controlling the operation of the robot 3. The numerical control system 1 controls the operations of the machine tool 2 and the robot 3 in conjunction with each other by using the numerical control device 5 and the robot controller 6 which are communicably connected to each other.

The machine tool 2 is, for example, a lathe, a ball mill, a milling machine, a grinding machine, a laser processing machine, an injection molding machine, or the like. However, the present disclosure is not limited thereto. The machine tool 2 executes various operations such as a machining operation on a workpiece (not shown), an opening/closing operation of a chuck holding the workpiece, and an opening/closing operation of a door provided in a machining area of the workpiece, in accordance with various command signals transmitted from the numerical control device 5 in accordance with a procedure described later.

The robot 3 moves under the control of the robot controller 6, and performs a predetermined operations on, for example, a workpiece to be machined by the machine tool 2. The robot 3 is, for example, a multi-joint robot, and a tool 32 for holding, machining, and inspecting a workpiece is attached to an arm tip portion 31 of the robot 3. Hereinafter, a case where the robot 3 is a six-axis articulated robot will be described. However, the present invention is not limited thereto. Furthermore, in the following description, the robot 3 is a six-axis articulated robot. However, the number of axes is not limited thereto.

The numerical control device 5 and the robot controller 6 are each a computer including hardware such as an arithmetic processing unit such as a CPU (Central Processing Unit), an auxiliary storage unit such as an HDD (Hard Disk Drive) or SSD (Solid State Drive) in which various programs are stored, a main storage unit such as RAM (Random Access Memory) in which data temporarily required for the arithmetic processing unit to execute the programs is stored, and an operation means such as a keyboard in which the operator performs various operations, and a display means such as a display for displaying various kinds of information to an operator. The robot controller 6 and the numerical control device 5 can transmit and receive various signals to and from each other by Ethernet (registered trademark), for example.

Figure 2:
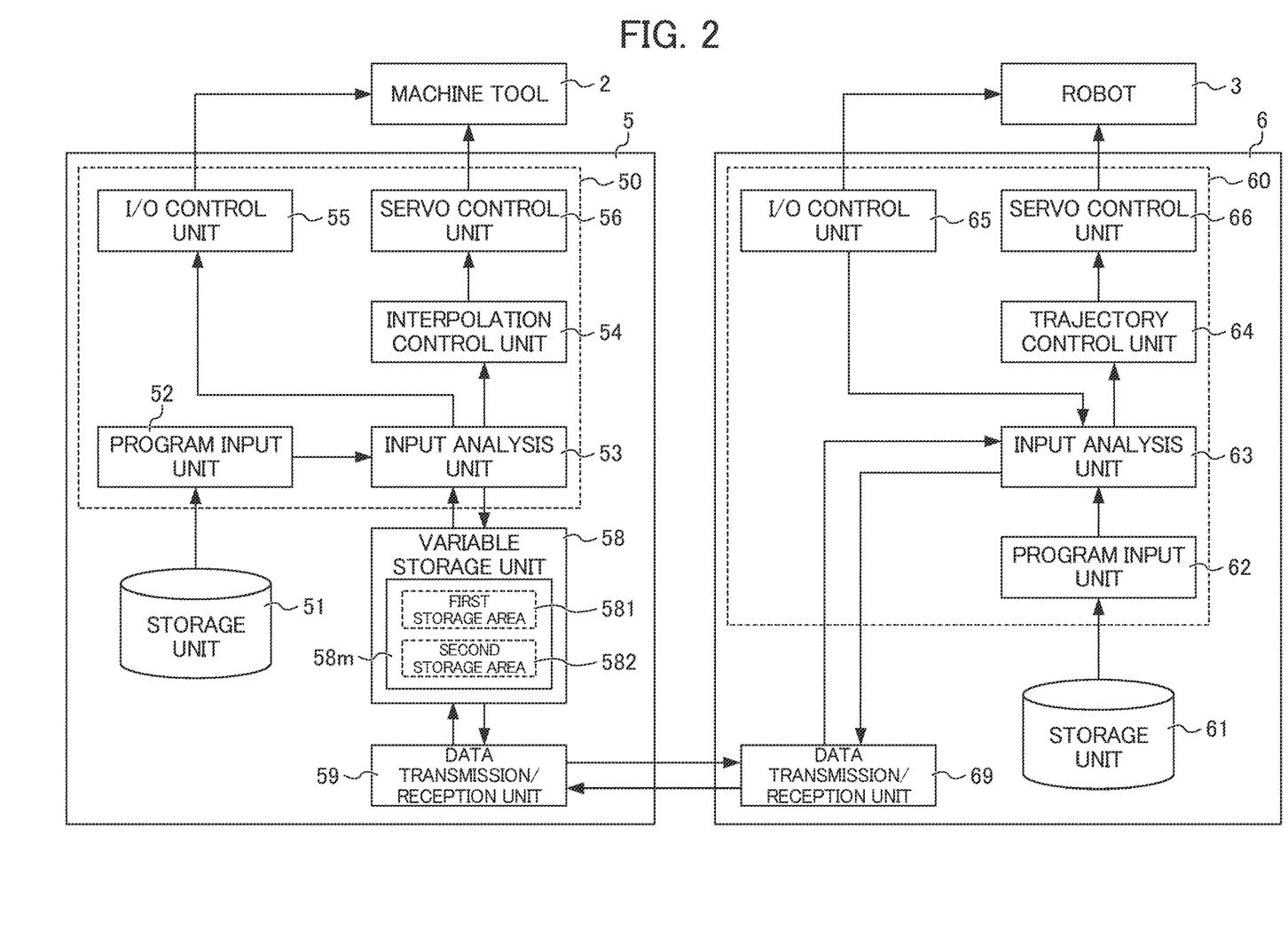
FIG. 2 is a functional block diagram of a numerical control device and a robot controller.

FIG. 2 is a functional block diagram of the numerical control device 5 and the robot controller 6.

First, the detailed configuration of the numerical control device 5 will be described. As shown in FIG. 2, in the numerical control device 5, the abovementioned hardware configuration implements various functions such as a machine tool control module 50 serving as a first control unit for controlling the operation of the machine tool 2, a storage unit 51 for storing numerical control programs, a variable storage unit 58 for storing values of a plurality of variables that can be read and written by the machine tool control module 50 and a robot control module 60 described later, and a data transmission/reception unit 59.

The storage unit 51 stores numerical control programs for controlling operations of the machine tool 2 (for example, an operation of the control axis, a rotation of the spindle, an opening/closing of the chuck, an opening/closing of the door, and the like). The numerical control programs stored in the storage unit 51 are created in advance by an operator in order to control the operation of the machine tool 2 in conjunction with the operation of the robot 3 under the control of the robot controller 6, and are written in a programming language using G code, M code, or the like.

The machine tool control module 50 reads and writes the variable value stored in the variable storage unit 58 based on the numerical control program, and controls the operation of the machine tool 2. More specifically, the machine tool control module 50 includes a program input unit 52, an input analysis unit 53, an interpolation control unit 54, an I/O control unit 55, and a servo control unit 56.

The program input unit 52 reads the numerical control program from the storage unit 51 and sequentially inputs the numerical control program to the input analysis unit 53.

The input analysis unit 53 sequentially analyzes the command type based on the numerical control program inputted from the program input unit 52 for each block, and transmits the analysis result to the I/O control unit 55, the interpolation control unit 54, and the variable storage unit 58.

The input analysis unit 53 inputs the acquired command to the I/O control unit 55 when the command type acquired based on the numerical control program is, for example, a command to open and close the chuck of the machine tool 2 or a command to open and close the door of the machine tool 2. When a command is inputted from the input analysis unit 53, the I/O control unit 55 inputs an I/O signal corresponding to the input command to the machine tool 2. With such a configuration, the chuck and door of the machine tool 2 are opened and closed in accordance with a procedure determined by the numerical control program.

When the command type acquired based on the numerical control program is, for example, a command to move the control axis of the machine tool 2, the input analysis unit 53 inputs the acquired command to the interpolation control unit 54. When a command is inputted from the input analysis unit 53, the interpolation control unit 54 calculates a movement path of the control axis according to the command by performing interpolation processing, and inputs the calculated movement path to the servo control unit 56. The servo control unit 56 feedback-controls the servo motor of the machine tool 2 so that the control axis moves along the movement path calculated by the interpolation control unit 54. Thus, the movement of the machine tool 2 is controlled by a procedure determined by the numerical control program.

When the command type acquired based on the numerical control program is a command to read the variable value stored in the variable storage unit 58 or a command to rewrite the variable value stored in the variable storage unit 58, the input analysis unit 53 inputs the acquired command to the variable storage unit 58.

The variable storage unit 58 includes variable memory 58m for storing a plurality of values of variables, and reads or rewrites the variable values stored in the variable memory 58m in accordance with a command inputted from the input analysis unit 53 or a command inputted from a robot control module 60 described later of the robot controller 6 via the data transmission/reception unit 59.

The variable memory 58*m* stores the plurality of variable values designated by numbers or character strings in a numerical control program for controlling the operation of the machine tool 2 in the machine tool control module 50 and a robot control program for controlling the operation of the robot 3 in the robot control module 60. In the present embodiment, as variables stored by the variable memory 58*m*, a case in which some macro variables (e.g., #100 to #199 and #500 to #599) defined in many numerical control devices are described. However, the present disclosure is not limited thereto.

When a command to read the variable value stored in the variable memory 58*m* is inputted from the input analysis unit 53, the variable storage unit 58 reads the variable value designated by the command from the variable memory 58*m*, and transmits the read value to the input analysis unit 53. Furthermore, when a command to rewrite the variable value stored in the variable memory 58*m* is inputted from the input analysis unit 53, the variable storage unit 58 rewrites the variable value designated by the command in the variable memory 58*m* to a value corresponding to the command. With such a configuration, it is possible for the machine tool control module 50 to read or rewrite the variable value stored in the variable memory 58*m*.

When a command to read the variable value stored in the variable memory 58*m* is inputted from the robot control module via the data transmission/reception unit 59, the variable storage unit 58 reads the variable value designated by the command from the variable memory 58*m*, and transmits the read value to the robot control module 60 via the data transmission/reception unit 59. Furthermore, when a command to rewrite the variable value stored in the variable memory 58*m* is inputted from the robot control module 60 via the data transmission/reception unit 59, the variable storage unit 58 rewrites the variable value designated by the command in the variable memory 58*m* to a value corresponding to the command. With such a configuration, it is possible for the robot control module 60 to read or rewrite the variable value stored in the variable memory 58*m*.

The variable memory 58*m* includes a first storage area 581 for storing a plurality of values of first variables to be used for notification or request from the machine tool control module 50 to the robot control module 60, and a second storage area 582 for storing a plurality of values of second variables to be used for notification or request from the robot control module 60 to the machine tool control module 50. In the following description, a case will be described in which variables #500 to #599 are assigned as the first variable, and variables #100 to #199 are assigned as the second variable.

Since the first variable stored in the first storage area 581 is used for notification or request from the machine tool control module 50 to the robot control module 60, it is preferable that the first variable is readable from both the machine tool control module 50 and the robot control module 60 and rewritable at least from the machine tool control module 50. Furthermore, since the second variable stored in the second storage area 582 is used for notification or request from the robot control module 60 to the machine tool control module 50, it is preferable that the second variable is readable from both the machine tool control module 50 and the robot control module 60 and rewritable at least from the robot controller 6.

The first variable #500 is assigned, for example, to notify the robot control module 60 of the stop state of the spindle of the machine tool 2 from the machine tool control module 50. When the value of the first variable #500 is 0, it indicates that the spindle of the machine tool 2 is moving, and when the value of the first variable #500 is 1, it indicates that the spindle of the machine tool 2 is stopped.

The first variable #501 is assigned, for example, to notify the robot control module 60 from the machine tool control module 50 that each axis of the machine tool 2 is being retracted to a position outside the interference area at the time of intrusion of the robot 3. When the value of the first variable #501 is 0, it indicates that each axis of the machine tool 2 exists in a predetermined interference region, and when the value of the first variable #501 is 1, it indicates that each axis of the machine tool 2 exists outside the interference region.

The first variable #502 is assigned, for example, to notify the robot control module 60 of the open/closed state of the door of the machine tool 2 from the machine tool control module 50. When the value of the first variable #502 is 0, it indicates that the door of the machine tool 2 is not open, and when the value of the first variable #502 is 1, it indicates that the door of the machine tool 2 is open.

The first variable #503 is assigned, for example, to request replacement of a workpiece of the machine tool 2 to the robot control module 60 from the machine tool control module 50. When the value of the first variable #503 is 0, it indicates that replacement of a workpiece is not requested, and when the value of the first variable #503 is 1, it indicates that the replacement of the workpiece is requested.

The second variable #100 is assigned, for example, to request stopping of the numerical control program being executed in the machine tool control module 50 from the robot control module 60 to the machine tool control module 50. When the value of the second variable #100 is 0, it indicates that the stop of the numerical control program is not requested, and when the value of the second variable #100 is 1, it indicates that the stop of the numerical control program is requested.

The second variable #101 is assigned, for example, to request the opening operation of the door of the machine tool 2 from the robot control module 60 to the machine tool control module 50. When the value of the second variable #101 is 0, it indicates that the door opening operation is not requested, and when the value of the second variable #101 is 1, it indicates that the door opening operation is requested.

The second variable #102 is assigned, for example, to request the closing operation of the door of the machine tool 2 from the robot control module 60 to the machine tool control module 50. When the value of the second variable #102 is 0, it indicates that the door closing operation is not requested, and when the value of the second variable #102 is 1, it indicates that the door closing operation is requested.

The second variable #103 is assigned, for example, to request an opening operation of the chuck of the machine tool 2 from the robot control module 60 to the machine tool control module 50. When the value of the second variable #103 is 0, it indicates that the chuck opening operation is not requested, and when the value of the second variable #103 is 1, it indicates that the chuck opening operation is requested.

The second variable #104 is assigned, for example, to request a closing operation of the chuck of the machine tool 2 from the robot control module 60 to the machine tool control module 50. When the value of the second variable #104 is 0, it indicates that the chuck closing operation is not requested, and when the value of the second variable #104 is 1, it indicates that the chuck closing operation is requested.

The second variable #105 is assigned, for example, to request execution of the first machining by the machine tool 2 from the robot control module 60 to the machine tool control module 50. When the value of the second variable #105 is 0, it indicates that the execution of the first machining is not requested, and when the value of the second variable #105 is 1, it indicates that the execution of the first machining is requested.

The second variable #106 is assigned, for example, to request execution of the second machining by the machine tool 2 from the robot control module 60 to the machine tool control module 50. When the value of the second variable #106 is 0, it indicates that the execution of the second machining is not requested, and when the value of the second variable #106 is 1, it indicates that the execution of the second machining is requested.

The second variable #107 is assigned, for example, to request execution of the third machining by the machine tool 2 from the robot control module 60 to the machine tool control module 50. When the value of the second variable #107 is 0, it indicates that the execution of the third machining is not requested, and when the value of the second variable #107 is 1, it indicates that the execution of the third machining is requested.

The second variable #150 is assigned, for example, to notify the machine tool control module 50 of the operation state of the robot 3 from the robot control module 60. When the value of the second variable #150 is 0, the robot 3 indicates that the robot 3 is moving, and when the value of the second variable #150 is 1, the robot 3 indicates that the operation of the robot 3 is completed.

It should be noted that the plurality of variable values stored in the variable memory 58m are reset to a predetermined initial value (for example, 0) in response to turning on the numerical control device 5.

Next, the configuration of the robot controller 6 will be described in detail. As shown in FIG. 2, the robot controller 6 includes the abovementioned hardware configuration that implements various functions such as of a robot control module 60 serving as a second controller for controlling the operation of the robot 3, a storage unit 61 for storing a robot control program, and a data transmission/reception unit 69.

The storage unit 61 stores robot control programs for controlling the operation of the robot 3. The robot control programs stored in the storage unit 61 are created in advance by an operator in order to control the operation of the robot 3 in conjunction with the operation of the machine tool 2 under the control of the numerical control device 5.

The robot control module 60 reads and writes the variable values stored in the variable storage unit 58 based on the robot control program, and controls the operation of the robot 3. More specifically, the robot control module 60 includes a program input unit 62, an input analysis unit 63, a trajectory control unit 64, an I/O control unit 65, and a servo control unit 66.

The program input unit 62 reads the robot control program from the storage unit 61 and sequentially inputs the robot control program to the input analysis unit 63.

The input analysis unit 63 sequentially analyzes the command type based on the robot control program inputted from the program input unit 62 for each block, and transmits the analysis result to the trajectory control unit 64, the I/O control unit 65, and the data transmission/reception unit 69.

When the command type acquired based on the robot control program is, for example, a command to move a control point of the robot 3 (for example, the arm tip portion 31), the input analysis unit 63 inputs the acquired command to the trajectory control unit 64. When a command is inputted from the input analysis unit 63, the trajectory control unit 64 calculates a movement trajectory of the control point when the control point of the robot 3 is moved to a position designated by the command, calculates an angle of each joint of the robot 3 according to the calculated movement trajectory as a target angle, and transmits these target angles to the servo control unit 66. The servo control unit 66 generates a robot control signal for the robot 3 by feedback-controlling each servo motor of the robot 3 so as to realize the target angle of each joint transmitted from the trajectory control unit 64, and inputs the robot control signal to the servo motors of the robot 3. With such a configuration, the operation of the robot 3 is controlled by a procedure determined by the robot control program.

When the command type acquired based on the robot control program is, for example, a command to drive the tool 32 attached to the arm tip portion 31 of the robot 3, the input analysis unit 63 inputs the acquired command to the I/O control unit 65. When a command is inputted from the input analysis unit 63, the I/O control unit 65 inputs an I/O signal corresponding to the input command to the tool 32. With such a configuration, the tool 32 of the robot 3 moves in accordance with a procedure determined by the robot control program.

When the command type acquired based on the robot control program is, for example, a command to read the variable value stored in the variable storage unit 58 or a command to rewrite the variable value stored in the variable storage unit 58, the input analysis unit 63 inputs the acquired command to the data transmission/reception unit 69.

When receiving a command to read the variable value from the input analysis unit 63, the data transmission/reception unit 69 transmits the command to the data transmission/reception unit 59 of the numerical control device 5. As described above, when such a read command is inputted, the variable storage unit 58 reads the variable value designated by the command from the variable memory 58m, and returns the read value to the input analysis unit 63 via the data transmission/reception unit 59 and the data transmission/reception unit 69. When receiving a command to rewrite the variable value from the input analysis unit 63, the data transmission/reception unit 69 transmits the command to the data transmission/reception unit 59 of the numerical control device 5. As described above, when such a rewrite command is inputted, the variable storage unit 58 rewrites the variable value designated by the command in the variable memory 58m to a value corresponding to the command. With such a configuration, it is possible for the robot control module 60 to read or rewrite the variable value stored in the variable memory 58m.

The numerical control system 1 as described above repeatedly executes a first variable rewriting step, a second variable rewriting step, a first variable reading step, a second variable reading step, a machine tool control step, and a robot control step, which are described below, in the order determined by the numerical control program and the robot control program, thereby controlling the operations of the machine tool 2 and the robot 3 in conjunction with each other.

In the first variable rewriting step, the machine tool control module 50 rewrites the first variable value stored in the first storage area 581 of the variable memory 58m according to the numerical control program. With such a configuration, it is possible to transmit various notifications and requests from the machine tool control module 50 to the robot control module 60.

In the second variable rewriting step, the robot control module 60 rewrites the second variable value stored in the second storage area 582 of the variable memory 58m according to the robot control program. With such a configuration, it is possible to transmit various notifications and requests from the robot control module 60 to the machine tool control module 50.

In the second variable reading step, the machine tool control module 50 reads the second variable value stored in the second storage area 582 of the variable memory 58m according to the numerical control program. As described above, the second variable value is appropriately rewritten by the robot control module 60 in the second variable rewriting step. Therefore, it is possible for the machine tool control module 50 to acquire various notifications and requests from the robot control module 60 by reading the second variable value.

In the first variable reading step, the robot control module 60 reads the first variable value stored in the first storage area 581 of the variable memory 58m according to the robot control program. As described above, the first variable value is appropriately rewritten by the machine tool control module 50 in the first variable rewriting step. Therefore, it is possible for the robot control module 60 to acquire various notifications and requests from the machine tool control module 50 by reading the first variable value.

In the machine tool control step, the machine tool control module 50 controls the operation of the machine tool 2 based on the numerical control program and the second variable value read in the second variable reading step. With such a configuration, it is possible to control the operation of the machine tool 2 at a timing and a mode determined based on various notifications and requests transmitted from the robot control module 60.

In the robot control step, the robot control module 60 controls the operation of the robot 3 and the tool 32 based on the robot control program and the first variable value read in the first variable reading step. With such a configuration, it is possible to control the operation of the robot 3 at a timing and in a mode determined based on various notifications and requests transmitted from the machine tool control module 50.

Figure 3:
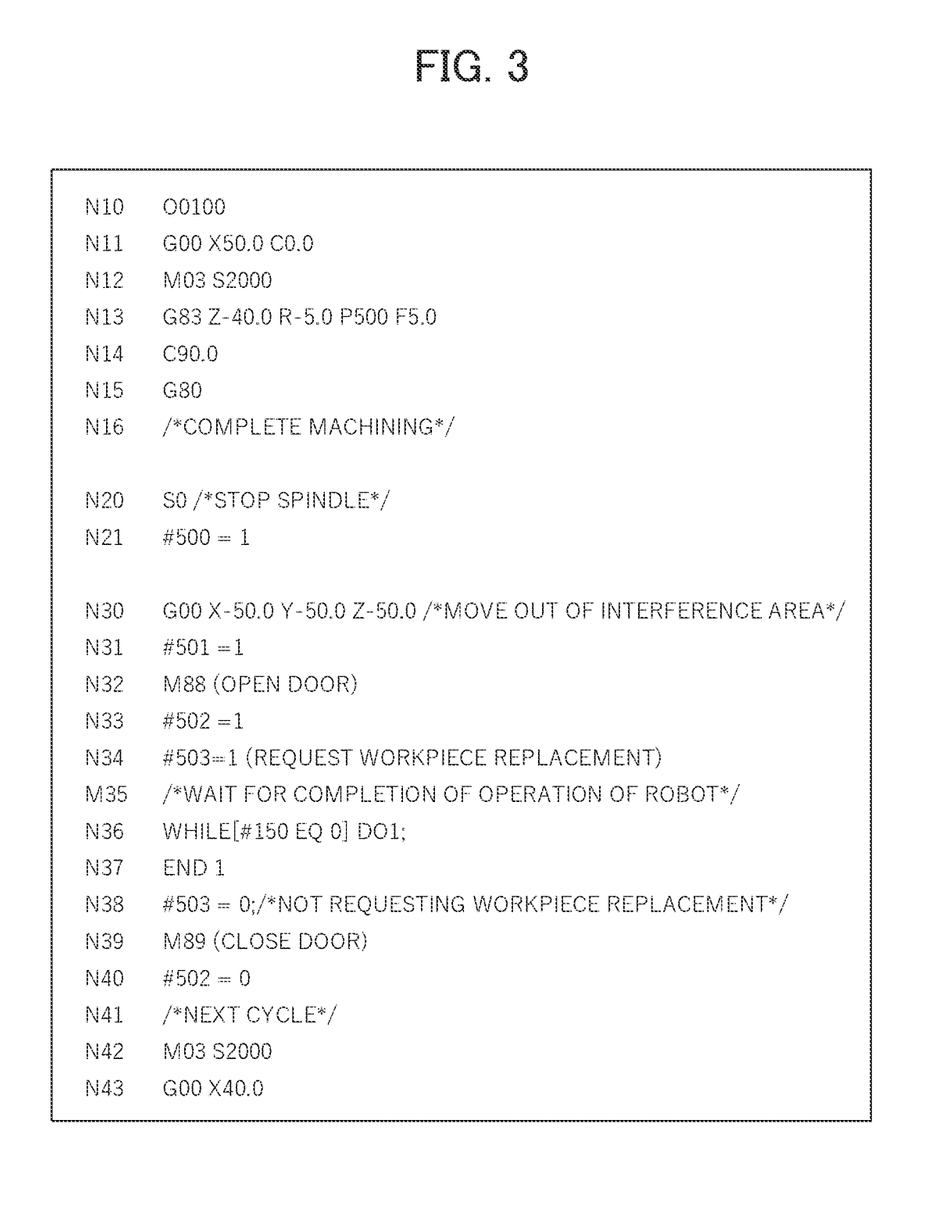
FIG. 3 is a diagram showing a first example of a numerical control program executed in a machine tool control module.

FIG. 3 is a diagram showing a first example of a numerical control program executed by the machine tool control module 50.

First, in the blocks indicated by sequence numbers "N10" to "N16", various commands "G00", "M03", "G83", and "G80" for machining a workpiece by the machine tool 2 are inputted to the machine tool control module 50. Thus, the machine tool control module 50 controls the operation of the machine tool 2 in accordance with the procedure determined by the numerical control program, and machines the workpiece.

Next, in the block indicated by the sequence number "N20", a command "S0" for stopping the rotation of the spindle of the machine tool 2 is inputted to the machine tool control module 50. Thus, the machine tool control module 50 stops the rotation of the spindle of the machine tool 2.

Next, in the block indicated by the sequence number "N21", a command "#500=1" for rewriting the first variable value #500 from "0" as an initial value to "1" is inputted to the machine tool control module 50. Thus, the machine tool control module 50 rewrites the first variable value #500 stored in the first storage area 581 of the variable memory 58m from "0" to "1" in order to notify the robot control module 60 that the spindle of the machine tool 2 is stopped.

Next, in the block indicated by the sequence number "N30", a command "G00" for retracting each axis of the machine tool 2 out of a predetermined interference region is inputted to the machine tool control module 50. Thus, the machine tool control module 50 moves each axis of the machine tool 2 to a position designated by the command "G00".

Next, in the block indicated by the sequence number "N31", a command "#501=1" for rewriting the first variable value #501 from "0" as an initial value to "1" is inputted to the machine tool control module 50. Thus, the machine tool control module 50 rewrites the first variable value #501 stored in the first storage area 581 of the variable memory 58m from "0" to "1" in order to notify the robot control module 60 that each axis of the machine tool 2 exists outside the interference area.

Next, in the block indicated by the sequence number "N32", a command "M88" for opening the door of the machine tool 2 is inputted to the machine tool control module 50. Thus, the machine tool control module 50 opens the door of the machine tool 2.

Next, in the block indicated by the sequence number "N33", a command "#502=1" for rewriting the first variable value #502 from "0" as an initial value to "1" is inputted to the machine tool control module 50. Thus, the machine tool control module 50 rewrites the first variable value #502 stored in the first storage area 581 of the variable memory 58m from "0" to "1" in order to notify the robot control module 60 that the door of the machine tool 2 is open.

Next, in the block indicated by the sequence number "N34", a command "#503=1" for rewriting the first variable value #503 from "0" as an initial value to "1" is inputted to the machine tool control module 50. Thus, the machine tool control module 50 rewrites the first variable value #503 stored in the first storage area 581 of the variable memory 58m from "0" to "1" in order to request the robot control module 60 to replace a workpiece in the machine tool 2.

On the other hand, the robot control module 60 reads the first variable values #500, #501, #502, and #503 at predetermined intervals according to the robot control program. Furthermore, when the first variable values #500, #501, #502, and #503 stored in the first storage area 581 of the variable memory 58m are all "1", i.e., when the spindle of the machine tool 2 is in a stopped state, each axis exists outside the interference area, the door is in an open state, and a workpiece replacement operation is requested from the machine tool control module 50, the robot control module 60 controls the operations of the robot 3 and the tool 32 in accordance with a predetermined procedure to replace the workpiece. Thus, in the machine tool control module 50, when the execution of the block indicated by the sequence number "N34" is completed, the robot control module 60 starts the workpiece replacement operations using the robot 3 and the tool 32. When the workpiece replacement operations are completed, the robot control module 60 rewrites the second variable values #150 stored in the second storage area 582 of the variable memory 58m from "0" to "1", which is an initial value, according to the robot control program.

Next, in the blocks indicated by the sequence numbers "N36" to "N37", the machine tool control module 50 reads the second variable value #150, and repeatedly determines whether or not the read value is "0" at a predetermined cycle. That is, the machine tool control module 50 waits for completion of the workpiece replacement operation by the robot control module 60. When the read second variable value #150 is "1", that is, when the robot control module 60 notifies that the workpiece replacement operation has been completed, the machine tool control module 50 moves to the block indicated by the next sequence number "N38".

Next, in the block indicated by the sequence number "N38", a command "#503=0" for rewriting the first variable value #503 from "1" to "0" is inputted to the machine tool control module 50. Thus, the machine tool control module 50 withdraws the request for the workpiece replacement operation to the robot control module 60.

Next, in the block indicated by the sequence number "N39", a command "M89" for closing the door of the machine tool 2 is inputted to the machine tool control module 50. Thus, the machine tool control module 50 closes the door of the machine tool 2.

Next, in the block indicated by the sequence number "N40", a command "#502=0" for rewriting the first variable value #502 from "1" to "0" is inputted to the machine tool control module 50. Thus, the machine tool control module 50 rewrites the first variable value #502 stored in the first storage area 581 of the variable memory 58*m* from "1" to "0" in order to notify the robot control module 60 that the door of the machine tool 2 is closed.

Next, in the blocks indicated by sequence numbers "N41" to "N43", various commands "M03" and "G00" for machining a new workpiece replaced by the machine tool 2 are inputted to the machine tool control module 50. Thus, the machine tool control module 50 controls the operation of the machine tool 2 in accordance with the procedure determined by the numerical control program, and machines the workpiece.

Figure 4:
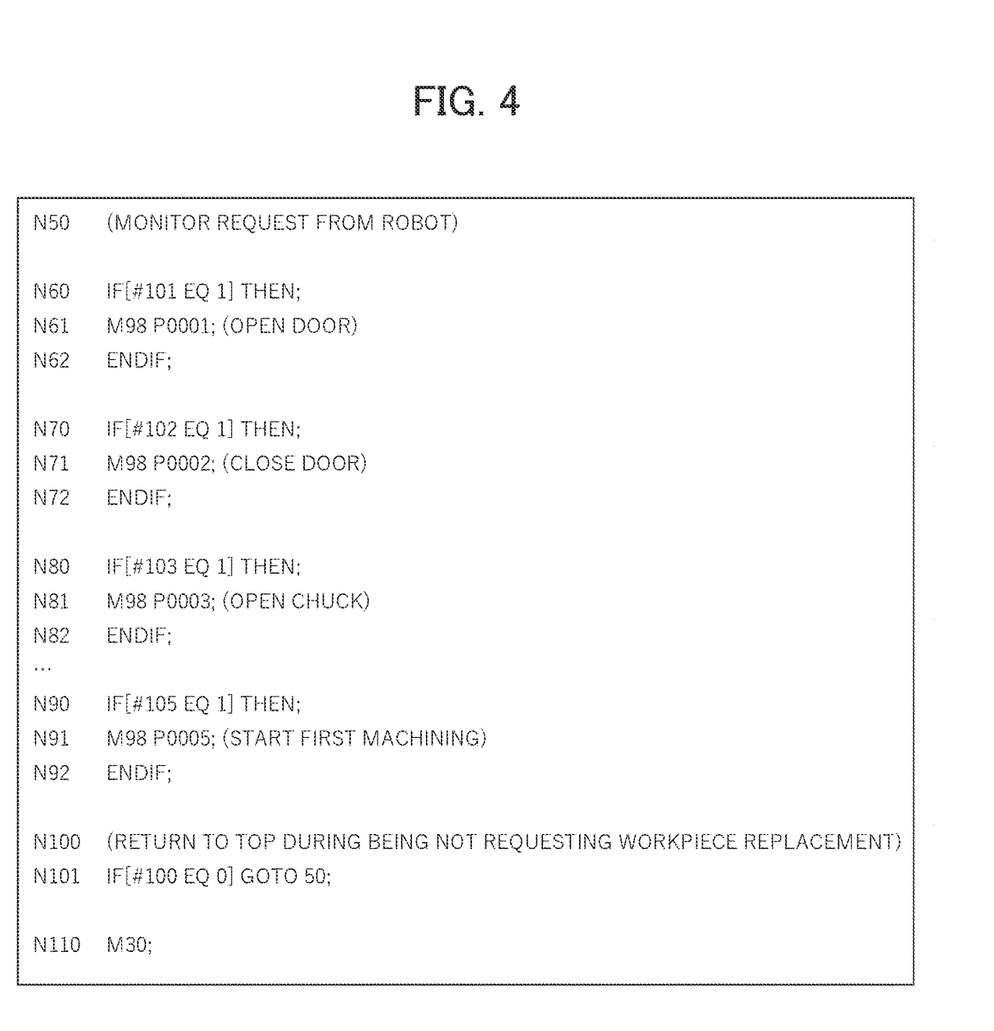
FIG. 4 is a diagram showing a second example of a numerical control program executed in the machine tool control module.

FIG. 4 is a diagram showing a second example of a numerical control program executed by the machine tool control module 50.

It should be noted that the robot control module 60 controls the operation of the robot 3 according to the robot control program, and rewrites the second variable values #100 to #107 stored in the second storage area 582 of the variable memory 58*m* according to the robot control program.

The numerical control program shown in FIG. 4 monitors a request from the robot control module 60 by reading the second variable values #100 to #107 at a predetermined period in the machine tool control module 50, and controls the operation of the machine tool 2 in accordance with the read second variable values #100 to #107.

First, in the blocks indicated by sequence numbers "N60" to "N62", the machine tool control module 50 reads the second variable value #101 stored in the second storage area 582 of the variable memory 58*m*, and determines whether or not the read value is "1". When the second variable value #101 is "1", that is, when the opening operation of the door of the machine tool 2 is requested from the robot control module 60, the machine tool control module 50 calls a subprogram of the program number "0001" according to the command "M98" for calling the subprogram, and when the second variable value #101 is "0", the machine tool control module 50 moves to the next block.

Figure 5:
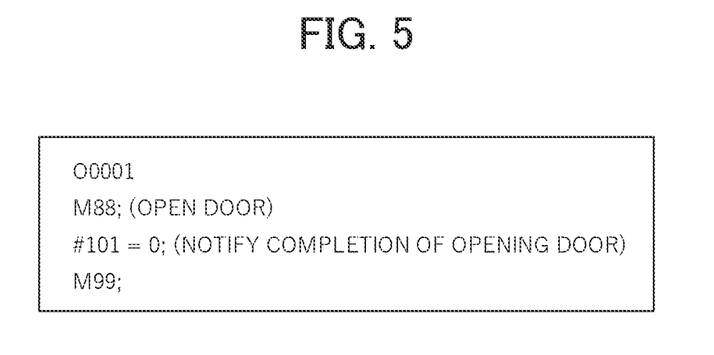
FIG. 5 is an example of a subprogram called in accordance with a numerical control program.

FIG. 5 is a diagram showing an example of a subprogram of a program number "0001". When the subprogram shown in FIG. 5 is called, the machine tool control module 50 opens the door of the machine tool 2 in accordance with the command "M88", then resets the second variable value #101 to "0", and then returns to the main program shown in FIG. 4 in accordance with the command "M99".

Next, in the blocks indicated by the sequence numbers "N70" to "N72", the machine tool control module 50 reads the second variable value #102 stored in the second storage area 582 of the variable memory 58*m*, and determines whether or not the read value is "1". When the second variable value #102 is "1", that is, when the closing operation of the door of the machine tool 2 is requested from the robot control module 60, the machine tool control module 50 executes the subprogram of the program number "0002", and when the second variable value #102 is "0", the machine tool control module 50 moves to the next block. Here, the machine tool control module 50 closes the door of the machine tool 2 by executing the subprogram of the program number "0002", then resets the second variable value #102 to "0", and then returns to the main program shown in FIG. 4.

Next, in the blocks indicated by the sequence numbers "N80" to "N82", the machine tool control module 50 reads the second variable value #103 stored in the second storage area 582 of the variable memory 58*m*, and determines whether or not the read value is "1". Furthermore, when the second variable value #103 is "1", that is, when the chuck opening operation of the machine tool 2 is requested from the robot control module 60, the machine tool control module 50 executes the subprogram of the program number "0003", and when the second variable value #103 is "0", the machine tool control module 50 moves to the next block. Here, the machine tool control module closes the chuck of the machine tool 2 by executing the subprogram of the program number "0003", then resets the second variable value #103 to "0", and then returns to the main program shown in FIG. 4.

Next, in the blocks indicated by the sequence numbers "N80" to "N82", the machine tool control module 50 reads the second variable value #103 stored in the second storage area 582 of the variable memory 58*m*, and determines whether or not the read value is "1". When the second variable value #103 is "1", that is, when the chuck opening operation of the machine tool 2 is requested from the robot control module 60, the machine tool control module 50 executes the subprogram of the program number "0003", and when the second variable value #103 is "0", the machine tool control module 50 moves to the next block. Here, the machine tool control module 50 closes the chuck of the machine tool 2 by executing the subprogram of the program number "0003", then resets the second variable value #103 to "0", and then returns to the main program shown in FIG. 4.

Next, in the blocks indicated by the sequence numbers "N90" to "N92", the machine tool control module 50 reads the second variable value #105 stored in the second storage area 582 of the variable memory 58*m*, and determines whether or not the read value is "1". When the second variable value #105 is "1", that is, when a first machining operation by the machine tool 2 is requested from the robot control module 60, the machine tool control module 50 executes the subprogram of the program number "0005", and when the second variable value #105 is "0", the machine tool control module 50 moves to the next block. Here, the machine tool control module 50 executes the subprogram of the program number "0005" to execute the first machining operation of the machine tool 2, then resets the second variable value #105 to "0", and then returns to the main program shown in FIG. 4.

Next, in the blocks indicated by the sequence numbers "N100" to "N101", the machine tool control module 50 reads the second variable value #100 stored in the second storage area 582 of the variable memory 58*m*, and determines whether or not the read value is "0". When the second variable value #100 is "0", that is, when stop of the numerical control program is not requested from the robot control module 60, the machine tool control module 50 returns to the block indicated by the sequence number "N50" and monitors the second variable values #100 to #107 again. Furthermore, when the second variable value #100 is "1", i.e., when the robot control module 60 requests the stop of the numerical control program, the machine tool control module 50 moves to the block indicated by the sequence number "N110" and ends the numerical control program shown in FIG. 4.

As described above, the machine tool control module 50 monitors the request from the robot control module 60 by reading the second variable values #101 to #107 at a predetermined period until the second variable value #100 is rewritten from "0" to "1", in other words, until the stop of the numerical control program is requested from the robot control module 60 and, when any one of the second variable values #101 to #107 is rewritten from "0" to "1" by the robot control module 60, controls the operation of the machine tool 2 in a manner corresponding to the rewritten second variable at the rewritten timing.

According to the present embodiment, the following advantageous effects are achieved. The numerical control system 1 includes the machine tool control module 50 that controls the operation of the machine tool 2 based on the numerical control program, the robot control module 60 that controls the operation of the robot 3 based on the robot control program, and the variable storage unit 58 that stores the plurality of variable values that can be read and written from both the machine tool control module 50 and the robot control module 60. The machine tool control module 50 reads a rewritable variable value from the robot control module 60 and controls the operation of the machine tool 2 based on the read variable value, and the robot control module 60 reads a rewritable variable value from the machine tool control module 50 and controls the operation of the robot 3 based on the read variable value. According to the numerical control system 1, since it is possible to perform the notification and request from the machine tool control module 50 to the robot control module 60 and the notification and request from the robot control module 60 to the machine tool control module 50 via variables readable and written from both of them, it is possible to easily make the machine tool 2 and the robot 3 interlock with each other without adding an I/O signal or an external device or editing an existing ladder circuit. Furthermore, according to the numerical control system 1, it is possible to handle various automated forms only by storing various variable values in the variable storage unit 58.

In the numerical control system 1, the machine tool control module 50 reads and writes the variable value stored in the variable storage unit 58 based on the numerical control program, and the robot control module 60 reads and writes the variable value stored in the variable storage unit 58 based on the robot control program. That is, in the numerical control system 1, variables defined in the numerical control program and the robot control program are used as variables used for transmitting notifications and requests between the machine tool control module 50 and the robot control module 60. With such a configuration, it is possible to control the operation of the machine tool 2 and the operation of the robot 3 in conjunction with each other without updating the software of the existing numerical control device 5 or the robot controller 6.

In the numerical control system 1, the first storage area 581 of the variable storage unit 58 stores the first variable value to be rewritten according to the numerical control program, the second storage area 582 of the variable storage unit 58 stores the second variable value to be rewritten according to the robot control program, the machine tool control module 50 controls the operation of the machine tool 2 based on the second variable value, and rewrites the first variable value according to the numerical control program, and the robot control module 60 controls the operation of the robot 3 based on the first variable value, and rewrites the second variable value according to the robot control program. With such a configuration, in the numerical control system 1, it is possible to transmit a notification, a request, or the like from the machine tool control module 50 to the robot control module 60 using the first variable, and to transmit a notification, a request, or the like from the robot control module 60 to the machine tool control module 50 using the second variable.

In the numerical control system 1, the machine tool control module 50 of the numerical control device 5 and the robot control module 60 of the robot controller 6 can communicate with each other via the data transmission/reception units 59 and 69, the variable storage unit 58 is provided in the numerical control device 5, and the robot control module 60 reads and writes the variable value stored in the variable storage unit 58 via communication using the data transmission/reception units 59 and 69. With such a configuration, it is possible to control the operation of the machine tool 2 and the operation of the robot 3 in conjunction with each other without newly adding an external device for storing the variable value.

The present disclosure is not limited to the above embodiment, and various changes and modifications are possible.

For example, in the above embodiment, a case is described in which the variable storage unit 58 that stores the plurality of variable values that can be read and written from both the machine tool control module 50 and the robot control module 60 is provided in the numerical control device 5. However, the present disclosure is not limited thereto.

The variable storage unit may be provided, for example, in a robot control device communicably connected to the numerical control device. In such a case, since it is possible for the machine tool control module of the numerical control device to read and write the variable value stored in the variable storage unit provided in the robot control device via the communication, substantially the same advantageous effect as that of the above embodiment can be obtained.

Furthermore, the variable storage unit may be provided, for example, in a server communicably connected to each of the numerical control device and the robot controller. In such a case, since it is possible for the machine tool control module of the numerical control device and the robot control module of the robot control device to read and write the variable values stored in the variable storage unit provided in the server via the communication, substantially the same advantageous effect as in the above embodiment can be obtained.

EXPLANATION OF REFERENCE NUMERALS

1 . . . numerical control system
2 . . . machine tool
3 . . . robot
31 . . . arm tip portion 32 . . . tool
5 . . . numerical control device
51 . . . storage unit
50 . . . machine tool control module (first controller)
58 . . . variable storage unit (storage device)
58m . . . variable memory 581 . . . first storage area
582 . . . second storage area
59 . . . data transmission/reception unit
6 . . . robot controller
61 . . . storage unit
60 . . . robot control module
69 . . . data transmission/reception unit

The invention claimed is:

1. A numerical control system that controls operation of a machine tool and a robot in conjunction with each other, the numerical control system comprising:
a numerical control device including a first storage unit that stores a numerical control program and a first controller that controls the operation of the machine tool based on the numerical control program read from the first storage unit;
a robot control device including a second storage unit that stores a robot control program and a second controller that controls the operation of the robot based on the robot control program read from the second storage unit; and
a variable storage device implemented by a memory device that stores values of a plurality of first variables and a plurality of second variables, and reads and writes values of the first and second variables in response to a command to read and a command to write from the first controller and the second controller,
wherein the first controller sends a first rewriting command to write the value of the first variable and a first reading command to read the value of the second variable to the variable storage device according to the numerical control program,
the second controller sends a second rewriting command to write the value of the second variable and a second reading command to read the value of the first variable to the variable storage device according to the robot control program,
the first controller controls the operation of the machine tool based on the numerical control program and the value of the second variable read from the variable storage device based on the first reading command, and
the second controller controls the operation of the robot based on the robot control program and the value of the first variable read from the variable storage device based on the second reading command.

2. The numerical control system according to claim 1, wherein the first and second variables are designated by a number or a character string in the numerical control program and the robot control program.

3. The numerical control system according to claim 1, wherein
the numerical control device and the robot control device can communicate with each other,
the variable storage device is provided in the numerical control device, and
the second controller sends the second reading command and the second rewriting command to the variable storage device via the communication therebetween.

4. The numerical control system according to claim 1, wherein
the numerical control device and the robot control device can communicate with each other,
the variable storage device is provided in the robot control device, and
the first controller sends the first reading command and the first rewriting command to the variable storage device via the communication therebetween.

5. The numerical control system according to claim 1, wherein
the variable storage device is provided in a server which is communicable with the numerical control device and the robot control device,
the first controller sends the first reading command and the first rewriting command to the variable storage device via the communication therebetween, and
the second controller sends the second reading command and the second rewriting command to the variable storage device via the communication therebetween.

6. An industrial machine control method that controls operation of a machine tool and a robot in conjunction with each other by using a numerical control system, the numerical control system including:
a numerical control device including a first storage unit that stores a numerical control program and a first controller that controls the operation of the machine tool based on the numerical control program read from the first storage unit,
a robot control device including a second storage unit that stores a robot control program and a second controller that controls the operation of the robot based on the robot control program read from the second storage unit, and
a variable storage device implemented by a memory device that stores values of a plurality of first variables and a plurality of second variables, and reads and writes values of the first and second variables in response to a command to read and a command to write from the first controller and the second controller, the method comprising:
the first controller sending a first rewriting command to write the value of the first variable to the variable storage device according to the numerical control program,
the second controller sending a second rewriting command to write the value of the second variable to the variable storage device according to the robot control program,
the first controller sending a first reading command to read the value of the second variable to the variable storage device according to the numerical control program,
the first controller controlling the operation of the machine tool based on the numerical control program and the value of the second variable read from the variable storage device based on the first reading command,
the second controller sending a second reading command to read the value of the first variable to the variable storage device according to the robot control program, and
the second controller controlling the operation of the robot based on the robot control program and the value of the second variable read from the variable storage device based on the second reading command.

* * * * *